May 31, 1949.
G. C. MELVIN ET AL
2,471,439
DEVICE FOR SIMULATING RUNWAY LOCALIZER AND
GLIDE PATH BEAMS FOR TRAINING PURPOSES
Filed Nov. 14, 1945
3 Sheets-Sheet 1
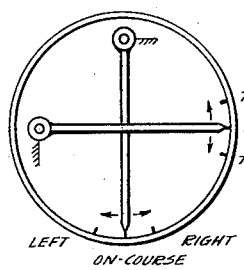
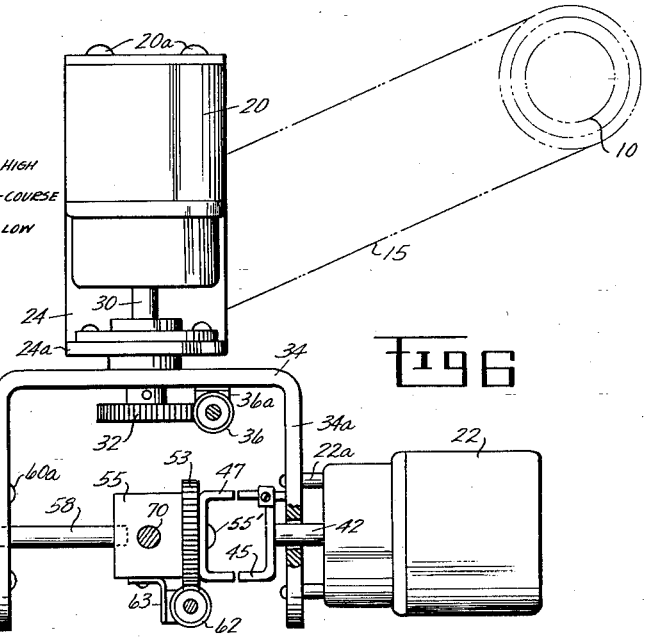
INVENTORS
PETER C. JONES
STANLEY B. WHITE
GRANT C. MELVIN
BY
ATTORNEYS

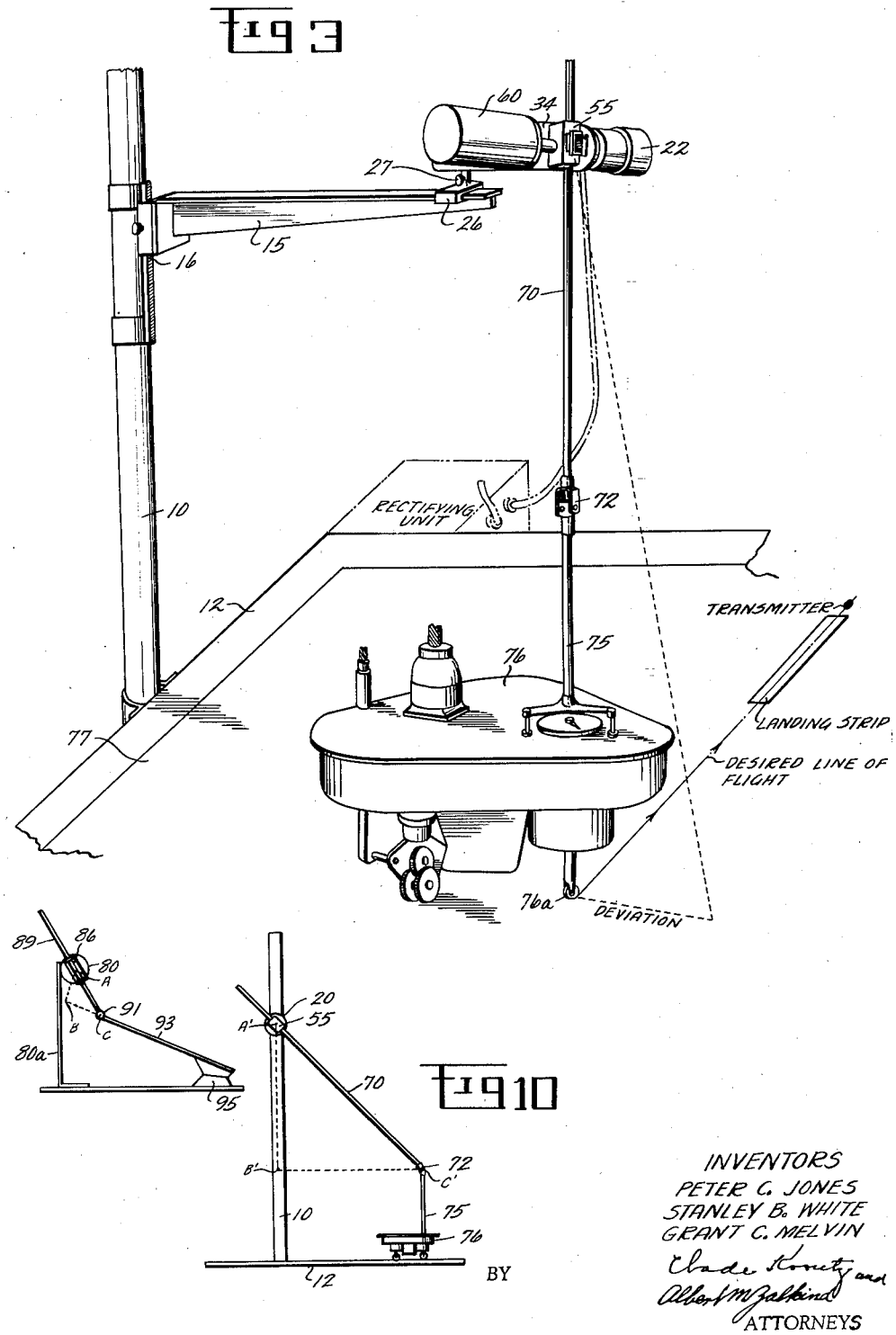

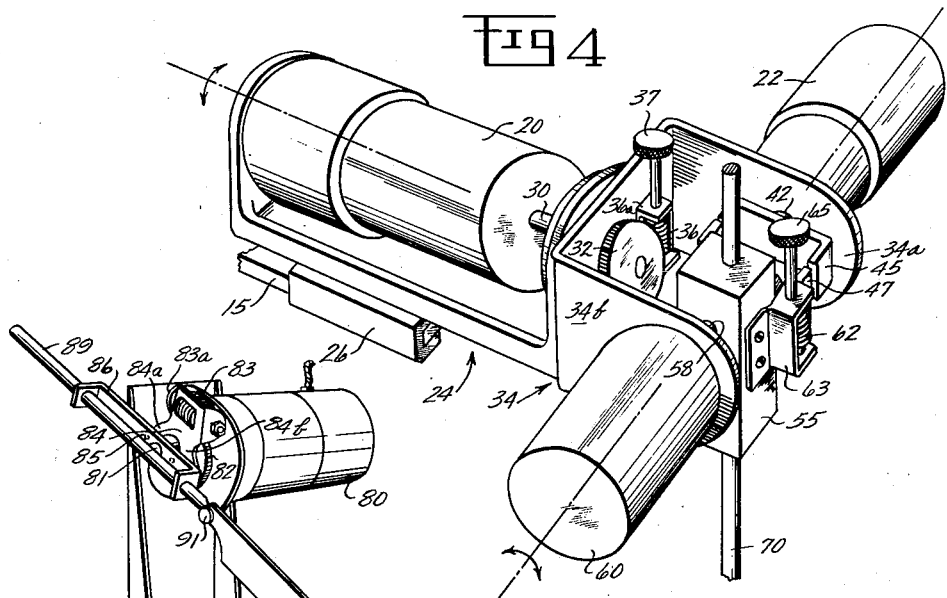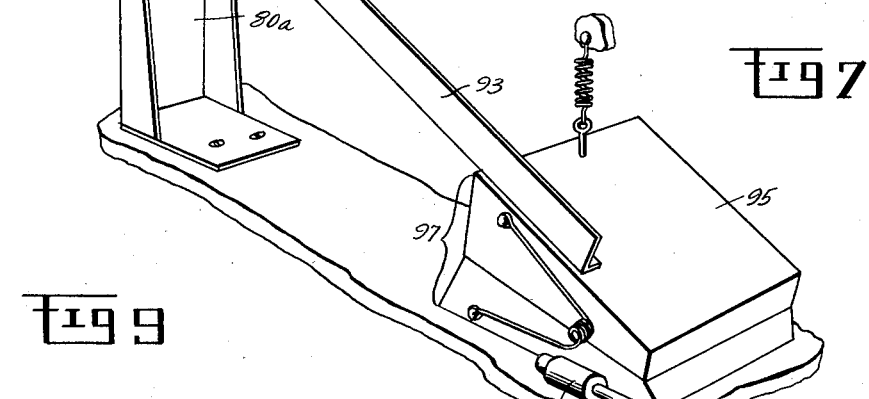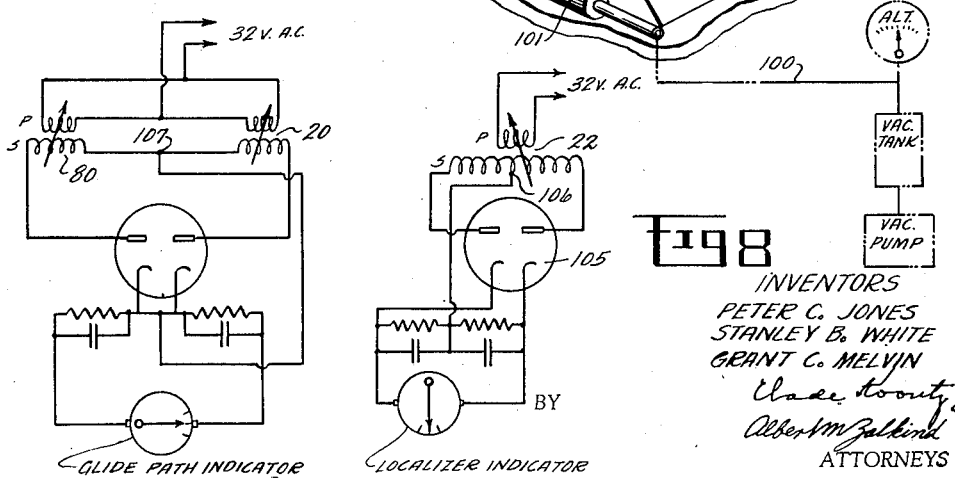

Patented May 31, 1949

2,471,439

UNITED STATES PATENT OFFICE 2,471,439

DEVICE FOR SIMULATING RUNWAY LOCAL-
IZER AND GLIDE PATH BEAMS FOR TRAIN-
ING PURPOSES

Grant C. Melvin, Springfield, Peter C. Jones and
Stanley B. White, Dayton, Ohio

Application November 14, 1945, Serial No. 628,646

7 Claims. (Cl. 35—10)

(Granted under the act of March 3, 1883, as
amended April 30, 1928; 370 O. G. 757)

The invention described herein may be manufactured and used by or for the Government for governmental purposes without the payment to us of any royalty thereon.

This invention relates to pilot training devices and more particularly to a device for use in conjunction with a Link trainer to simulate localizer and glide path beams for the purpose of training pilots in the use of such beams in making blind landings.

Fig. 1 of the drawings shows an exaggerated visual representation of illustrative sections of the beams of a conventional blind landing system. The system comprises a pair of radio transmitters usually mounted on vehicles (not shown) and situated at stations at the up-wind end of a runway. One of these transmitters is adapted to radiate a so-called "localizer beam" which in reality consists of a pair of radio beams having oscillations 180° out of phase, these beams being in substantial alignment with the runway although diverging from each other outwardly from the transmitter. The term "beam" will hereinafter be understood to refer to a single beam of the out of phase pair. The beams have a narrow angle therebetween which is predeterminable on a horizontal plane. The radiation intensities of the beams are equal in a constricted region of roughly conical shape having its apex at the transmitter. The pilot of an aircraft equipped with a suitable type of receiving set in conjunction with an indicating instrument for detecting this region of equal intensities is enabled to fly a straight course between the beams and thus be directed to the runway. The indicating instrument referred to is termed a localizer indicator and consists essentially of a zero center galvanometer having a normally vertically disposed needle, the arrangement being such that the instrument needle is deflected to the right or left of an on-course indicia mark on an associated scale, depending on the comparative intensities of reception received by the aircraft radio. The out of phase characteristic of the beams is utilized to affect bucking voltages on the galvanometer, needle motion of which is affected directionally by respective voltages. Thus, when a plane is flying on-course, that is, in substantially alignment with the transmitter and the runway, the diverging beams are received in equal strength, the opposing voltages cancel each other and the localizer indicator needle is accordingly held in the on-course position. If for some reason the plane should wander from on-course toward the left or right beam, the radiation from the respective beam will be received at a higher intensity which will be manifested by deflection of the instrument needle in a directed sense so as to apprise the pilot that he is off-course to the left or right, as the case may be. In a similar manner, a so-called "glide path beam," consisting of another pair of out of phase beams, is radiated from a second transmitter, which beams diverge so that the angle therebetween is predeterminable in a vertical plane. Thus, a constricted region of equal intensities is obtained between these glide path beams which is directed upwardly at an angle with the horizon depending upon the predetermined glide angle suitable for any given installation, usually about 2½°. As in the case of the diverging localizer beams, the radiation intensity of the diverging glide path beams effects opposing voltages on a second zero center galvanometer, having a normally horizontally disposed needle. This instrument is termed a glide path indicator, and is arranged in such a manner that when a plane is flying on-course, that is, following a predetermined glide path between the beams and toward the transmitter, the instrument needle is held in register with an on-course indicia mark on an associated scale, but in the event that the plane leaves the glide path by losing or gaining altitude the instrument needle is deflected upwardly or downwardly from the on-course position so as to indicate to the pilot that the plane is too high or too low.

The indicator instruments referred to above are generally combined in a single casing in such a manner that the needles are normally disposed at right angles to each other, the localizer, i. e., the left and right indicating needle, being vertical, and the glide path indicating needle being horizontal. The combination thus formed is termed a "cross-pointer indicator" and is depicted in Fig. 2 of the drawings.

Simulation of these blind landing beams for purposes of training student pilots in conjunction with Link trainers presents certain serious difficulties. In general, when simulating blind landings just as when actually engaged in making such landings, it is mandatory that a pilot keep close check on his cross-pointer indicator in order to be assured that the correct heading and altitude for the landing are being maintained. In order to accomplish this purpose, proper ground speed and rate of descent must be assured, i. e., simulated altitude must be correct at any point in the landing approach. In using a Link trainer for practice purposes the student pilot's course is conventionally followed by means of a moving recorder, the speed of which changes with the indicated speed of the aircraft as the recorder traverses a scale map or chart of a simulated landing area spread on a table, the recorder having an inking device or wheel for leaving an ink trace of the simulated course flown. Heretofore, the means provided for operating the cross-pointer indicator in the trainer cockpit comprised a human element, namely, an instructor located at the recorder table who operated manual controls to operate the pilot's cross-pointer indicator in accordance with visual perception of the position of the inking wheel on the chart. The procedure required the instructor to check the distance from station against altitude and supply by means of manual controls a corresponding indication on the glide path cross-pointer needle in the trainer cockpit. In view of the fact that the scaled down localizer path is very narrow, plus the fact that the indicating wheel is inconveniently located for such puroposes by being under the recorder, and taking into consideration that the instructor was obliged to simultaneously check distance from the station against altitude in order to supply a proper reading to the pilot's glide path indicator, it was found to be virtually impossible to give precise indications for each point on the course of the aircraft. Further, the most important point during the landing approach is that point which is just prior to landing. At such time the narrowed localizer path and glide path are very critical and with the previous method of simulation it was necessary for the instructor to perceive a sidewise movement of the indicating wheel of from $1/64$ to $1/32$ of an inch and a variation of altitude where $1\!\!\frac{1}{16}$ of an inch on the chart represented 115 feet of actual altitude at a $2\frac{1}{2}°$ glide path angle. A slight error made by the instructor at this point would be sufficient to cause the pilot to miss the runway completely.

Accordingly, a primary object of this invention is to provide an automatic system for operating a cross-pointer indicator in a trainer in response to motion of the recorder so as to completely eliminate the human element.

Another object of our invention is to provide such a system with means for closely simulating actual radio reception conditions experienced by a pilot in making a blind landing.

We are aware that attempts have been made to obtain these objects by the use of variable resistances, however, such expedients have been found to be subject to certain drawbacks due to space limitations which make resistor arrangements impractical. Accordingly, our invention comprises a pair of variocouplers supported above the recorder table and having a mechanical linkage system for rotating the primary windings thereof in response to motion of the recorder as it traverses a simulated flight path on a conventional radio beam chart. One of the variocouplers is mounted so that deviation of the recorder left or right of the required line of flight produces either clockwise or counterclockwise rotation of the primary coil. The primary is fed with alternating current and a center tapped secondary is utilized in conjunction with a rectifying circuit and a localizer indicator of the zero center galvanometer type so that clockwise or counterclockwise rotation of the primary from an inductively neutral position with respect to the halves of the secondary on either side of the center tap causes an unbalance of opposing voltages induced in such halves, which unbalance is manifested by the localizer indicator as a reading to the left or right of the on-course indicia mark.

The other variocoupler is mounted so that rotation of the primary coil is effected by motion of the recorder along the required line of flight, the rotation of the primary being a measure of simulated "distance-from-station," i. e., from a runway. A third variocoupler is used in conjunction with the distance-from-station variocoupler, being provided with a mechanical actuating system so that the primary is rotated in response to simulated altitude changes in the altimeter system of the training unit. The primaries of these latter variocouplers are connected in parallel and fed with alternating current, the arrangement being such that opposing voltages induced in the respective secondaries are rectified and impressed on a glide path indicator of the zero center galvanometer type. The mechanical actuating systems are so devised that simulated on-course flight, i. e., flight at a predetermined rate of descent, effects synchronized rotation of the respective primaries, whereby equal voltages are induced in the respective secondaries which is manifested by an on-course reading on the glide path indicator. However, an incorrect simulated glide path causes asynchronization of the primaries with ensuing unbalanced voltages induced in the respective secondaries manifested by an appropriate reading on the indicator. In the practice of our invention a conventional cross-pointer indicator as shown in Fig. 2 is utilized which, in conjunction with our automatic device, effects readings realistically simulating for training purposes those normally expected in actual practice under blind landing conditions.

Other objects and features of our invention will be apparent from the following detailed description, in conjunction with the remaining drawings, in which:

Fig. 3 is a perspective view showing the arrangement of certain elements of our invention in conjunction with the chart table and recorder of a Link trainer.

Fig. 4 is an isometric view showing details of the mechanical arrangement of the major portion of our system.

Fig. 5 is an elevation of the view shown in Fig. 4.

Fig. 6 is a plan view of the arrangement shown in Fig. 4.

Fig. 7 is a perspective of the mechanical arrangement of our system in conjunction with the altimeter suction system of a Link trainer.

Figs. 8 and 9 are rectifying circuits which comprise the electrical system of our invention.

Fig. 10 is an elevation showing the geometric relationship of certain mechanisms disclosed in Figs. 3 and 7.

With reference to Figs. 3–6, our invention consists of a supporting post 10 secured to a conventional chart table 12 which is one of the items comprising a Link trainer unit. An arm 15 vertically adjustable on post 10 by any suitable means such as a rack mechanism 16 supports a pair of variocoupler units 20 and 22. Unit 20 comprises a part of the glide path indicator system whereas unit 22 comprises a part of the localizer indicating system. The variocoupler units are secured to arm 15 through an intermediate bracket 24 to which unit 20 is bolted by bolts 20a. Bracket 24 has a clamp 26 slidably arranged on arm 15 and provided with a set screw 27 so as to be positionable at any point along the length of the arm. A shaft 30 coupled to the primary coil (not shown) of the variocoupler 20 passes through an ear 24a of bracket 24 and is pinned to a worm gear 32 interiorly of a bracket 34. The weight of bracket 34 and its integrally associated elements is borne by shaft 30 which has bearing support in ear 24a. A worm 36 secured in any suitable manner to bracket 34 as by a bracket 36a and manually operable by a knurled knob 37 engages the worm gear 32. The arrangement is such that rotation of bracket 34 about the axis of shaft 30 will cause rotation of that shaft by virtue of the friction existing between worm 36 and gear 32. Manual rotation, however, of knob 37 will provide rotation of shaft 30 independently of bracket 34. The variocoupler 22 is secured to an ear of bracket 34 in any suitable manner as by bolts 22a and a shaft 42 coupled to the primary coil (not shown) of variocoupler 22 passes through an ear 34a of bracket 34 and is secured to a permanent yoke-type magnet 45 at the central point thereof as shown. A similar magnet 47 is rotatably mounted in a manner to be described and is aligned with magnet 45 so that unlike poles are in proximity, the two magnets constituting in effect a magnetic clutch. The arrangement is such that rotation of magnet 47 will, by magnetic attraction, cause magnet 45 to follow rotatably within limits predetermined by abutment thereof with a pair of manually adjustable screws 50 and 51 suitably secured in nut members 50a and 51a, respectively, to the ear 34a. Magnet 47 is rigidly secured to a worm gear 53 which in turn is pivotally secured to a block-like rotary member 55 by means of a central pivot 55'. The member 55 is rigidly mounted on a shaft 58 extending into a counterweight 60 and having rotative bearing support therein. Counterweight 60 is adapted to balance the weight of variocoupler 22 and is secured to an ear 34b of bracket 34 in any suitable manner as by screws 60a. A worm 62 is secured to the block-like member 55 in any suitable manner as by a bracket 63 and engages the gear 53. The arrangement is such that rotation of member 55 about the axis of shafts 42 and 58 will cause rotation of the primary coil of variocoupler 22 through shaft 42 by frictional engagement of gear 53 with worm 62 and the magnetic coupling of magnets 45 and 47, within the limits determined by screws 50 and 51 as heretofore mentioned. Shaft 42 may, however, be rotated independently and with respect to member 55 by means of a knurled knob 65 secured to worm 62, since rotation of the gear 53 and magnet 47 independently of member 55 also causes rotation of magnet 45 and the attached shaft 42. A rod-like member 70 passes upwardly through a bore in member 55 and has a smooth sliding fit therein. A universal joint 72 connects rod 70 to an upright staff 75 rigidly secured to an otherwise conventional recorder 76 having an inking wheel 76a which will be understood to traverse a chart 77 on the table 12 responsive to actuation of the controls in the trainer cockpit (not shown). It will now be appreciated from the foregoing that planar motion of the recorder 76 in any direction will rock rod 70 through the universal joint 72 and by virtue of the sliding coaction of rod 70 with member 55 and the degree of rotational freedom provided thereto about the crossed axes of shafts 30 and 42, no restraint will be experienced by rod 70 in following the course of the recorder 76. It will be further apparent that rocking motion of rod 70 will cause rotation of shafts 30 and 42 to comparative degrees depending on the direction of motion of recorder 76 with respect to the axes of shafts 30 and 42.

A third variocoupler 80 (Fig. 7) is utilized in the trainer body, being supported therein on a bracket 80a in any suitable manner. A shaft 81 extends from variocoupler 80 and will be understood to be secured to the primary coil for causing rotation thereof. Pinned on shaft 81 is a worm gear 82 which engages a worm 83 supported in a bracket 84 having integral members 84a and b in a yoke-like arrangement secured as by rivets 85 or the like to a bracket 86. Shaft 81 protrudes through a portion of bracket 86 as shown but is freely rotatable with respect thereto. The arrangement is such that rotation of bracket 86 about the axis of shaft 81 will by virtue of the frictional engagement of worm 83 with gear 82 cause rotation of shaft 81. However, worm 83 is provided with a knurled knob 83a and shaft 81 may be rotated independently of and with respect to bracket 86 by means of the worm and gear arrangement upon adjustment of knurled knob 83a. Rotation of bracket 86 about the axis of shaft 81 is effected by means of a shaft 89 slidably arranged in bores provided in the ears of bracket 86, as shown, and having pivotal co-action as by a loose rivet 91 with an arm 93 rigidly secured to a relatively movable portion 95 of a bellows 97. Bellows 97 is of conventional form and comprises the relatively pivotal member 95 together with associated springs, as shown, and it will be understood that pivotal motion of member 95 will cause rocking of arm 93 which rocking is translated into rotary motion of shaft 81 by virtue of shaft 89 and associated parts. The altimeter suction line 100 of the trainer is coupled to bellows 95 by means of a fixture 101, the trainer altimeter vacuum tank and vacuum pump being shown associated with the line 100 so that it will be understood that the amount of pressure to which the trainer altimeter is responsive will cause bellows 97 to expand or contract to a proportional degree whereby movement of member 95 will cause rotation of shaft 81 correspondingly.

Variocouplers 20 and 80 rotate in unison when a proper rate of descent is simulated as will be hereinafter explained in connection with Fig. 10.

With particular attention now to Fig. 8, variocoupler 22 is symbolically illustrated showing the primary winding fed by a conventionally available 32-volt source of alternating current. The secondary of variocoupler 22 has its terminals connected to the plates of a duo-diode rectifier tube 105, the cathodes of which are connected across a zero centered galvanometer representing the corresponding localizer indicator portion of the combined indicator shown in Fig. 2. A center tap 106 in the secondary is connected conventionally through a filtering arrangement comprising condenser by-passed resistances, to the cathodes of the rectifier. It will be apparent that rotation of the primary with respect to the secondary will induce opposing voltages therein which upon being rectified in the tube 105 will impress opposed D. C. voltages on the localizer indicator. When the primary of the variocoupler is inductively centralized with respect to the secondary winding the voltages impressed on the indicator are equal and opposite and accordingly the indicator needle is not deflected. If, however, the primary is rotated into some position which causes a disparity in the induced voltages in the secondary winding, the indicator needle will be deflected accordingly in a directed sense. By reference to Fig. 3 it will be understood how rotation of the primary of variocoupler 22 is effected by rocking of rod 70 should recorder 76 deviate from the desired line of flight, a deviation to the right being illustrated.

With particular attention now to Fig. 9, the variocouplers 20 and 80 are shown connected to a duo-diode rectifier substantially identical with tube 105 of Fig. 8, and the glide path indicator of Fig. 9 is a corresponding portion of the indicator shown in Fig. 2. Similarity with the circuit of Fig. 8 may be seen in that the primaries of variocouplers 20 and 80 are fed in a parallel arrangement with a 32-volt source of alternating current and the secondaries of the variocouplers are connected so as to provide a center tap connection 107, whereby the voltage induced in the secondary of variocoupler 20 opposes that induced in the secondary of variocoupler 80. Accordingly, when the primaries are rotated in unison, i. e., at the same angular velocity, so as to induce equal voltages in the secondaries, the needle of the indicator will not be deflected from the on-course position. However, should the inductive relationship of the primaries with respect to the secondaries be changed by rotating the primaries out of unison, the indicator needle will be deflected up or down depending on particular conditions.

In actual construction of our invention it was found that commercially available delta connected self synchronous transmitters or Selsyns were well suited for our purposes in so far as the variocouplers 20, 22 and 80 were concerned. Three such Selsyns were utilized. Two of the windings of one Selsyn were used to function in the manner of the center tap secondary of variocoupler 22. Another Selsyn was arranged to function in the manner disclosed for variocoupler 20 and the third Selsyn was used as the variocoupler 80, only one winding in each of these latter Selsyns being utilized as secondaries of the respective variocouplers disclosed.

For an on-course indication in so far as flight at a predetermined glide angle is concerned there must be a definite geometric relationship maintained between the mechanical actuating system comprising the rod 70 of Fig. 3 and the rod 81 of Fig. 7 in order to rotate the primaries of variocouplers 20 and 80 in unison. The relationship is such that rods 70 and 81 are synchronizable members in that they move in angular unison as such times as they form the hypotenuses of a pair of similar right angle triangles. This relationship is shown in the triangles ABC and A'B'C' of Fig. 10, it being noted that these triangles may be oriented in space in any position whatsoever relative to each other so long as their similarity is preserved. Inasmuch as angle BAC varies in direct response to simulated altitude change by action of bellows 97 (Fig. 7) it follows that if the recorder moves at a particular rate of speed in a particular direction the angle B'A'C' will be maintained equal to BAC whereby motion of rods 70 and 81 is synchronized and the primaries of variocouplers 20 and 80 will rotate in synchronization, whence an on-course indication will be obtained. Any deviation in speed or direction of the recorder will, however, cause a synchronization of the variocouplers, thus effecting a high or low deflection of the glide path indicator in such a manner as to simulate off-course flight. It will now be appreciated that with suitable design of the respective mechanical systems comprising rods 70 and 81 and members 75 and 93 our invention may be utilized with a Link trainer so that motion of the recorder in a predetermined line with a predetermined speed will effect synchronized rotation of variocouplers 20 and 80 so as to obtain an on-course indication in so far as flight along a simulated glide path is concerned. In other words, a proper rate of descent will be signified by an on-course reading of the indicator where the line of traverse of the recorder corresponds with a required line of flight on a chart such as the chart 77 of Fig. 3. Further, any angle of glide may be predetermined by suitable proportioning of the effective lengths of rods 70 and 81 with respect to each other for a specific simulated flying speed. Conversely, any flying speed may be predetermined by relative proportioning of the rods for any specific simulated glide angle.

Conceivably the recorder 76 of Fig. 3 could deviate from the required line of flight and still continue to give an on-course reading on the glide path indicator if the linear speed of the recorder were increased so as to maintain a velocity component in the direction of the required line of flight equal to that velocity which is properly required. Such a condition would be immediately detected, however, by the localizer indicator which is arranged by virtue of suitable circuit design and stop screws 50 and 51 (Fig. 5) to give a full scale deflection to the left or right within relatively narrow limits provided by a predeterminable degree of adjustment of the stop screws. The function of the magnetic clutch provided by magnets 45 and 47 now becomes apparent, since the clutch permits a relatively wide traverse of recorder 76 to the left or right of the required flight path, beyond the relatively narrow limits within which full scale deflection of the localizer indicator needle is manifested. This feature realistically simulates actual flight conditions since a pair of localizer beams affect the radio receiver in an aircraft only in a fairly constricted critical region, usually about 3½° to either side of the on-course indication.

In order to operate our device, it is necessary to first place recorder 76 (Fig. 3) so that the indicating wheel 76a is directly over the station. Various adjustments are then made with rack 16 and slide 26 so that rod 70 is vertical and aligned with staff 75. Variocoupler 22 is then oriented so that its axis, that is the shaft 42 (Figs. 4 through 6), is aligned with the desired line of flight and knob 65 is adjusted to rotate the primary so that an on-course indication is effected by the localizer indicator in the trainer. The knurled knobs 37 (Fig. 4) and 83a (Fig. 7) are then adjusted to rotate the primaries of their respective variocouplers independently of rod 70 so that an on-course reading is effected by the glide path indicator in the trainer, the trainer altimeter being set to a suitable reference leval at this time. In practice it has been found feasible to use a reference level of 500 feet below sea level for most uniform response. Since the altimeter is responsive merely to presure differentials it will be understood that any suitable reference level may be utilized to simulate the ground level of a hypothetical air strip. The foregoing set-up being completed, the recorder 76 (Fig. 3) is then positioned at any arbitrary point on chart 77 and the student pilot commences solving the problem of finding the localizer beam and following the required flight path with proper rate of descent.

Having thus described our invention, we claim:

1. A device for simulating flight at a predetermined rates of descent for use in conjunction with a pilot training unit having an altimeter system for simulating altitude changes and a recorder adapted to traverse a radio beam chart at a predetermined rate proportional to simulated horizontal trainer speed, comprising, a first mechanical linkage system adapted to be actuated by said altimeter system, a second mechanical linkage system adapted to be actuated by motion of said recorder, electrical means actuated by said linkage systems to effect respective voltages proportional to respective degrees of actuation wherein equal degrees of actuation effect equal voltages, means associated with said electrical means including an indicator for comparing said voltages to provide an index of simulated rate of descent with respect to said recorder motion, each linkage system having a member actuably engaging respective electrical means, said members being arranged to move in synchronization during simulated flight at said predetermined rate of descent and predetermined recorder motion whereby said electrical means are actuated at the same rate to effect equal voltages for providing an on-course indication of said indicator, wherein said electrical means comprises a variocoupler having a primary actuated by said first mechanical linkage system and a second variocoupler having a primary actuated by said second mechanical linkage system, said primaries being adapted to be energized with alternating current, said associated means comprising a rectifying circuit, said indicator comprising a zero center galvanometer, the secondaries of said variocouplers being connected to said circuit in such a manner as to impress opposing direct current voltages on said indicator, whereby synchronized actuation of said primaries affects no deflection of said indicator and asynchronized actuation of said primaries deflects said indicator in a directed sense depending on the comparative degrees of induction in said variocouplers as determined by respective rates of actuation of said primaries by respective mechanical linkage systems, including additional electrical means actuated by said second mechanical linkage system, said first mentioned electrical means comprising a distance-to-station variocoupler and said additional electrical means comprising a localizer variocoupler, means for mounting the rotational axes of the primaries of said variocouplers perpendicular to each other, said member of said second mechanical linkage system comprising a rod coupled to said recorder and adapted to rotate said primaries in response to motion of said recorder, whereby the comparitive degree of rotation of said primaries is proportional to the components of recorder traverse in directions perpendicular to respective axes, and an electrical circuit including a localizer indicator associated with said localizer variocoupler.

2. A blind landing training device for simulating localizer radio beam reception and for simulating flight at a predetermined rate of descent for use in conjunction with a pilot training unit having an altimeter system for simulating altitude changes and a recorder adapted to traverse a radio beam chart at a predetermined rate proportional to simulated horizontal trainer speed, comprising, a first mechanical linkage system adapted to be actuated by said altimeter system, a second mechanical linkage system adapted to be actuated by motion of said recorder, electrical means actuated by said linkage systems to effect respective voltages proportional to respective degrees of actuation wherein equal degrees of actuation effect equal voltages, means associated with said electrical means including an indicator for comparing said voltages to provide an index of rate of descent with respect to said recorder motion, each linkage system having a member actuatably engaging respective electrical means, said members being arranged to move in synchronization during simulated flight at said predetermined rate of descent and predetermined recorder motion whereby said electrical means are actuated at the same rate to effect equal voltages for providing an on-course indication of said indicator, including additional electrical means actuated by said second mechanical linkage system, said first mentioned electrical means comprising a distance-to-station variocoupler and said additional electrical means comprising a localizer variocoupler, means for mounting the rotational axes of the primaries of said variocouplers perpendicular to each other, said member of said second mechanical linkage system comprising a rod coupled to said recorder and adapted to rotate said primaries in response to motion of said recorder, whereby the comparative degrees of rotation of said primaries is proportional to the components of recorder traverse in directions perpendicular to respective axes, and an electrical circuit including a localizer indicator associated with said localizer variocoupler, and wherein said mounting means comprises a bracket adapted to be secured in fixed position with respect to said radio beam chart and adapted to support said distance-to-station variocoupler, a second bracket rotatably integral with the primary of said last named variocoupler and adapted to rotate said primary, said localizer variocoupler being secured to said latter bracket, a rotatable member secured to said latter bracket and adapted to rotate in a plane perpendicular to the axis of the primary of said localizer variocoupler and being secured to said primary for rotation thereof, said rod being guided for reciprocal motion with respect to said rotatable member whereby angular motion of said rod with respect to the axes of said primaries effects rotation thereof.

3. In a device as set forth in claim 2 including means for rotating said primaries independently of said mechanical linkage systems to afford an initial on-course reading of said indicators.

4. A device for simulating flight at a predetermined rate of descent for use in conjunction with a pilot training unit having an altimeter system for simulating altitude changes and a recorder adapted to traverse a radio beam chart at a rate proportional to simulated horizontal trainer speed, comprising, a first mechanical linkage system adapted to be actuated by said altimeter system, a second mechanical linkage system adapted to be actuated by motion of said recorder, electrical means responsive to actuation of said linkage systems to effect respective voltages proportional to respective degrees of actuation, and wherein said electrical means comprises a variocoupler having a primary actuated by said first mechanical linkage system and a second variocoupler having a primary actuated by said second mechanical linkage system, said primaries being adapted to be energized with alternating current, means associated with said electrical means including an indicator for comparing said voltages to provide an index of simulated rate of descent with respect to said recorder motion, said associated means comprising a rectifying circuit, said indicator comprising a zero center galvanometer, the secondaries of said variocouplers being connected to said circuit in such a manner as to impress opposing voltages on said indicator, whereby synchronized actuation of said primaries effects no deflection of said indicator and asynchronized actuation of said primaries deflects said indicator in a directed sense depending on the comparative degrees of induction in said variocouplers as determined by respective rates of actuation of said primaries by respective mechanical linkage systems, including additional electrical means actuated by said second mechanical linkage system, said first mentioned electrical means comprising a distance-to-station variocoupler and said additional electrical means comprising a localizer variocoupler, means for mounting the rotational axes of the primaries of said variocouplers perpendicular to each other, said member of said second mechanical linkage system comprising a universally pivotable member coupled to said recorder and adapted to rotate said primaries in response to motion of said recorder, whereby the comparative degrees of rotation of said primaries is proportional to the components of recorder traverse in directions perpendicular to respective axes, and an electrical circuit including a localizer indicator associated with said localizer variocoupler.

5. A training device for use in conjunction with a pilot training unit having a recorder adapted to traverse a radio beam chart fixed to a chart table along a predetermined course toward a simulated station, comprising a variocoupler having a primary winding adapted to be energized with alternating current and having a center-tapped secondary winding, supporting means for said variocoupler including an arm adjustably connected to said chart table, means mounting said windings for relative rotation so as to vary the comparative degree of mutual induction between said primary winding and the secondary winding portions on either side of the center tap thereof, means for causing said relative rotation including a rod extending from said variocoupler toward said chart table, an upright staff carried on said recorder and rigidly connected thereto, means coupling said rod and staff to actuate said variocoupler in response to deviations of said recorder from said predetermined course, deviations from said course being adapted to produce a difference in the degree of mutual induction between said primary winding and the secondary winding portions on either side of said center tap whereby opposing voltages are induced in said secondary winding portions, and means including an indicator having an on-course indicia for comparing said voltages to determine the direction and extent of said deviations.

6. A training device for simulating blind flight guided by localizer radio beams, for use in conjunction with a pilot training unit having a recorder adapted to traverse a radio beam chart along a predetermined course toward a simulated station, comprising a variocoupler having a primary adapted to be energized with alternating current and a secondary including means for having induced therein a pair of voltages by virtue of mutual induction with said primary, means for orienting said primary with respect to said secondary in response to motion of said recorder so as to provide comparative values of said induced voltages corresponding to deviation of said recorder to the left or right of said predetermined course, means including an indicator having an on-course indicia for determining the direction of course deviation, said means for orienting said primary including a rod-like member, means for rendering said member rotatably integral with said primary but slidable with respect thereto, and means including a universal joint for coupling said member to said recorder.

7. A training device for simulating blind flight guided by radio beams, for use in conjunction with a pilot training unit having a recorder adapted to traverse a radio beam chart along a predetermined course toward a simulated station, comprising, a variocoupler having a primary adapted to be oriented with respect to a secondary by motion of said recorder, including means for thus orienting said primary comprising a rod-like member and means for rendering said member rotatably integral with but slidable with respect to said primary, and means including a universal joint for coupling said member to said recorder.

GRANT C. MELVIN.
PETER C. JONES.
STANLEY B. WHITE.

REFERENCES CITED

The following references are of record in the file of this patent:

UNITED STATES PATENTS

| Number | Name | Date |
|---|---|---|
| 706,554 | Hall | Aug. 12, 1902 |
| 1,655,244 | Rowell | Jan. 3, 1928 |
| 2,070,178 | Pottenger | Feb. 9, 1937 |
| 2,164,412 | Koster | July 4, 1939 |
| 2,179,663 | Link | Nov. 14, 1939 |
| 2,226,726 | Kramer | Dec. 31, 1940 |
| 2,326,764 | Crane | Aug. 17, 1943 |
| 2,332,523 | Norden | Oct. 26, 1943 |
| 2,346,693 | Lyman | Apr. 18, 1944 |
| 2,358,793 | Crane | Sept. 26, 1944 |
| 2,366,603 | Dehmel | Jan. 2, 1945 |
| 2,445,673 | Kail | July 20, 1948 |
| 2,448,544 | Muller | Sept. 7, 1948 |
| 2,450,240 | Kail | Sept. 28, 1948 |
| 2,454,503 | Crane | Nov. 23, 1948 |
| 2,457,130 | Crane | Dec. 28, 1948 |

OTHER REFERENCES

Air Corps News Letter, vol. 21, No. 6, March 15, 1938, pages 7 and 8.